(12) United States Patent
Chatterjee et al.

(10) Patent No.: US 10,956,524 B2
(45) Date of Patent: Mar. 23, 2021

(54) JOINT OPTIMIZATION OF NOTIFICATION AND FEED

(71) Applicant: Microsoft Technology Licensing, LLC, Redmond, WA (US)

(72) Inventors: Shaunak Chatterjee, Sunnyvale, CA (US); Ajith Muralidharan, Sunnyvale, CA (US); Viral Gupta, Sunnyvale, CA (US); Yijie Wang, Sunnyvale, CA (US); Deepak Agarwal, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 236 days.

(21) Appl. No.: 16/144,848

(22) Filed: Sep. 27, 2018

(65) Prior Publication Data
US 2020/0104420 A1 Apr. 2, 2020

(51) Int. Cl.
| | |
|---|---|
| *G06F 7/02* | (2006.01) |
| *G06F 16/00* | (2019.01) |
| *G06F 16/9535* | (2019.01) |
| *G06F 17/18* | (2006.01) |
| *G06N 20/00* | (2019.01) |
| *G06F 16/9038* | (2019.01) |
| *G06F 16/2453* | (2019.01) |
| *G06Q 50/00* | (2012.01) |

(52) U.S. Cl.
CPC .... *G06F 16/9535* (2019.01); *G06F 16/24544* (2019.01); *G06F 16/9038* (2019.01); *G06F 17/18* (2013.01); *G06N 20/00* (2019.01); *G06Q 50/01* (2013.01)

(58) Field of Classification Search
CPC ............ G06F 17/18; G06F 16/9038; G06F 16/24544; G06F 16/9535; G06F 11/3438; G06F 16/58; G06N 20/20; G06N 20/00; G06N 5/022; G06N 20/10; G06N 3/08; G06N 5/003; G06N 7/005; G06Q 50/01
See application file for complete search history.

(56) References Cited

U.S. PATENT DOCUMENTS 8,918,468 B1 * 12/2014 Fisher ................... G06F 40/295
709/206
10,491,962 B2 * 11/2019 Siddiq ................ G06F 16/9536
(Continued)

*Primary Examiner* — Bruce M Moser
(74) *Attorney, Agent, or Firm* — Schwegman Lundberg & Woessner, P.A.

(57) ABSTRACT

In an example embodiment, a machine learned model is used to determine whether to send a notification for a feed object to a user. This machine learned model is optimized not just based on the likelihood that the notification will cause the user to interact with the feed object, but also the likely short-term and long-term impacts of the user interacting with the feed object. This machine learned model factors in not only the viewer's probability of immediate action, such as clicking on a feed object, but also the probability of long-term impact, such as the display causing the viewer to contribute content to the network or the viewer's response encouraging more people to contribute content to the network. As such, the machine learned model is optimized not just on notification interactivity but also on feed objects interactivity.

20 Claims, 12 Drawing Sheets

(56) References Cited

U.S. PATENT DOCUMENTS

| | | | | |
|---|---|---|---|---|
| 2012/0101985 A1* | 4/2012 | Kemp | ................ | G06F 16/9535 |
| | | | | 707/609 |
| 2014/0019443 A1* | 1/2014 | Golshan | ............ | G06F 16/24578 |
| | | | | 707/723 |
| 2018/0232641 A1* | 8/2018 | Bostick | .................... | G06N 5/04 |
| 2019/0361868 A1* | 11/2019 | Rogynskyy | ......... | G06F 11/3452 |

* cited by examiner

806

FEED THE POTENTIAL FEED OBJECT, ID OF FIRST USER, AND INDICATION THAT A NOTIFICATION REGARDING THE POTENTIAL FEED OBJECT WILL BE SENT TO THE FIRST USER TO FIRST MACHINE LEARNED MODEL 900

↓

FEED THE POTENTIAL FEED OBJECT, ID OF FIRST USER, AND INDICATION THAT A NOTIFICATION REGARDING THE POTENTIAL FEED OBJECT WILL BE SENT TO THE FIRST USER TO SECOND MACHINE LEARNED MODEL 902

↓

COMBINE OUTPUT OF FIRST MACHINE LEARNED MODEL, SECOND MACHINE LEARNED MODEL, AND FIRST RECURSIVELY CALCULATED DOWNSTREAM IMPACT SCORE FOR EACH OF THE ONE OR MORE ADDITIONAL USERS HAVING A CONNECTION TO THE FIRST USER 904

*FIG. 9*

JOINT OPTIMIZATION OF NOTIFICATION AND FEED

TECHNICAL FIELD

The present disclosure generally relates to technical problems encountered in machine learned models. More particularly, the present disclosure relates to the joint optimization of machine learned models for notifications and feeds.

BACKGROUND

Social networking services are online platforms that people use to build social networks or social relations with other people. In recent years it has become popular for social networking services to provide feeds to users, where updates or items of interest can be presented to users who have logged into the service. The feed may contain, for example, indications that a social networking connection for a user has been promoted, has changed jobs, and the like. The feed may also contain articles of interest to the user, either because they have some connection to one or more of the user's social networking connections (e.g., an article written by a friend) or because they are linked to an area of interest for the user, as identified by the social network service (e.g., the article is on a subject the user has identified as an area of interest in their user profile).

It can be challenging for the social networking service to determine which of many potential items should be displayed in the feed and the order in which they should be displayed. This is typically handled via one or more algorithms implemented by the social networking service for selection and ranking of potential items to display. These algorithms, however, are based on determining the likelihood that the user will interact with the item in some way (e.g., select it, share it, like it, etc.). Such solutions are focused on the immediate impact of presenting the feed object (e.g., will this user click on the feed object). They fail to consider long-term impact, such as the possibility that the feed object will cause the viewer to contribute more to the social networking service (e.g., post feed objects of their own) and how the viewer's response might encourage other people to contribute more to the social networking service (e.g., if the viewer repasts the feed object, will other users follow suit).

One tool that a social networking service may use to encourage users to interact with feed objects is the use of notifications. A notification is an alert communicated to a user via electronic means, such as by email, text message, or surfacing of the alert in an operating system or browser operated by the user (such as a mobile device operating system). A user, for example, who is notified of a particular event (such as a friend's promotion) via email, or even just notified that an event has occurred related to one of their social networking contacts, may be more likely to interact with the corresponding feed object. Overuse of such notifications, however, can turn off certain users and actually cause less interaction with the feed objects.

From a technical perspective it is quite complex to design an algorithm for surfacing feed objects that can adequately capture the feed consumption ecosystem as a whole, including both immediate and long-term effects, as well as an algorithm to determine when to send out notifications for corresponding feed objects.

BRIEF DESCRIPTION OF THE DRAWINGS

Some embodiments of the technology are illustrated, by way of example and not limitation, in the figures of the accompanying drawings.

FIG. 9 is a flow diagram illustrating a method of calculating a first downstream impact score, in accordance with an example embodiment.

DETAILED DESCRIPTION

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

In an example embodiment, a machine learned model is used to determine whether to send a notification for a feed object to a user. This machine learned model is optimized not just based on the likelihood that the notification will cause the user to interact with the feed object, but also the likely short-term and long-term impacts of the user interacting with the feed object. This machine learned model factors in not only the viewer's probability of immediate action, such as clicking on a feed object, but also the probability of long-term impact, such as the display causing the viewer to contribute content to the network or the viewer's response encouraging more people to contribute content to the network. As such, the machine learned model is optimized not just on notification interactivity but also on feed objects interactivity.

Figure 1:
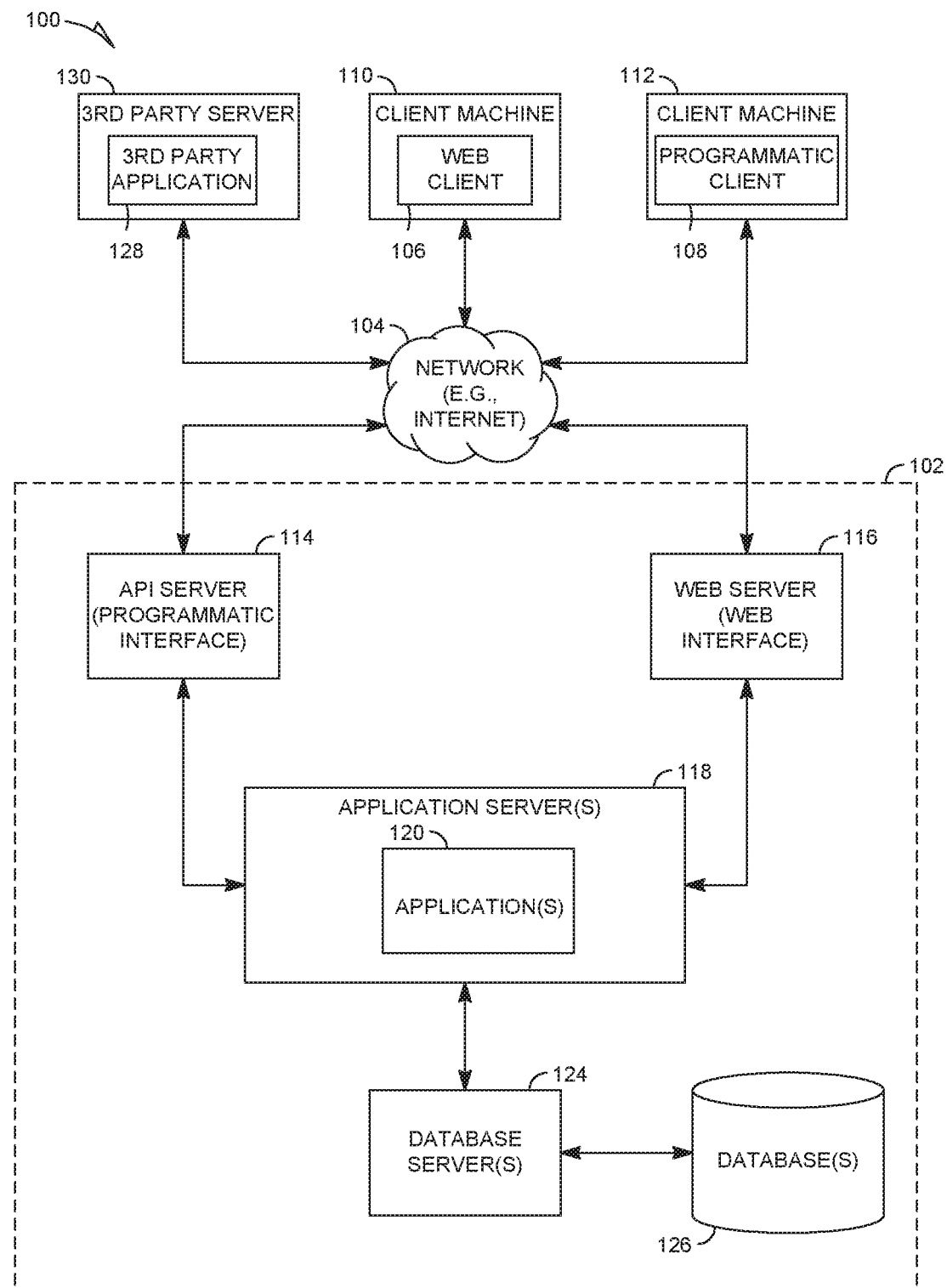
FIG. 1 is a block diagram illustrating a client-server system, in accordance with an example embodiment.

FIG. 1 is a block diagram illustrating a client-server system 100, in accordance with an example embodiment. A networked system 102 provides server-side functionality via a network 104 (e.g., the Internet or a wide area network (WAN)) to one or more clients. FIG. 1 illustrates, for example, a web client 106 (e.g., a browser) and a programmatic client 108 executing on respective client machines 110 and 112.

An application programming interface (API) server 114 and a web server 116 are coupled to, and provide programmatic and web interfaces respectively to, one or more application servers 118. The application server(s) 118 host one or more applications 120. The application server(s) 118 are, in turn, shown to be coupled to one or more database servers 124 that facilitate access to one or more databases 126. While the application(s) 120 are shown in FIG. 1 to form part of the networked system 102, it will be appreciated that, in alternative embodiments, the application(s) 120 may form part of a service that is separate and distinct from the networked system 102.

Further, while the client-server system 100 shown in FIG. 1 employs a client-server architecture, the present disclosure is, of course, not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the application(s) 120 via the programmatic interface provided by the API server 114.

FIG. 1 also illustrates a third-party application 128, executing on a third-party server 130, as having programmatic access to the networked system 102 via the programmatic interface provided by the API server 114. For example, the third-party application 128 may, utilizing information retrieved from the networked system 102, support one or more features or functions on a website hosted by a third party. The third-party website may, for example, provide one or more functions that are supported by the relevant applications 120 of the networked system 102.

In some embodiments, any website referred to herein may comprise online content that may be rendered on a variety of devices including, but not limited to, a desktop personal computer (PC), a laptop, and a mobile device (e.g., a tablet computer, smartphone, etc.). In this respect, any of these devices may be employed by a user to use the features of the present disclosure. In some embodiments, a user can use a mobile app on a mobile device (any of the client machines 110, 112 and the third-party server 130 may be a mobile device) to access and browse online content, such as any of the online content disclosed herein. A mobile server (e.g., the API server 114) may communicate with the mobile app and the application server(s) 118 in order to make the features of the present disclosure available on the mobile device.

Figure 2:
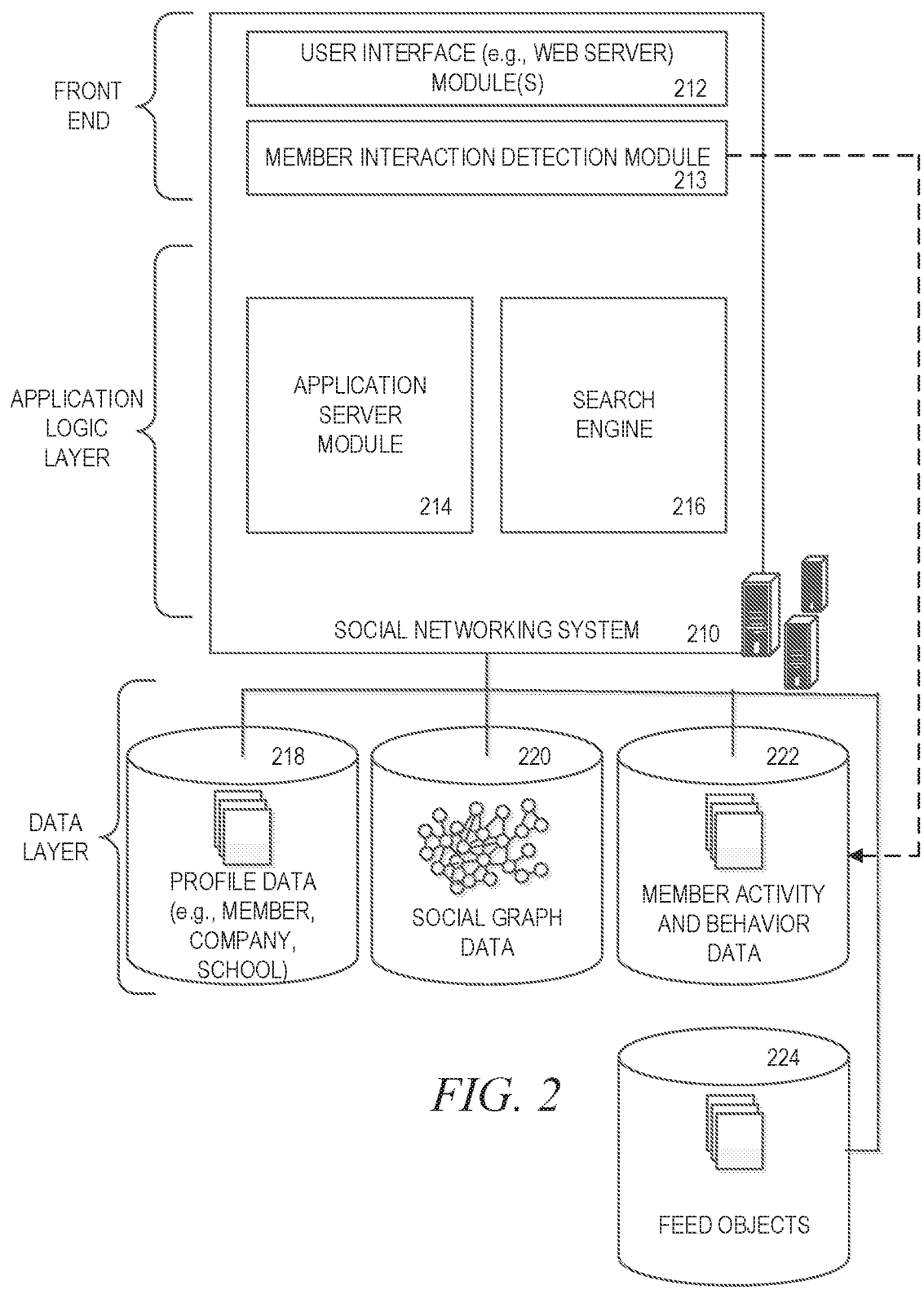
FIG. 2 is a block diagram showing the functional components of a social networking system consistent with some embodiments of the present disclosure.

In some embodiments, the networked system 102 may comprise functional components of a social networking service. FIG. 2 is a block diagram showing the functional components of a social networking system 210 consistent with some embodiments of the present disclosure. In some embodiments, a search engine 216 may reside on the application server(s) 118 in FIG. 1. However, it is contemplated that other configurations are also within the scope of the present disclosure.

As shown in FIG. 2, a front end may comprise a user interface module (e.g., a web server 116) 212, which receives requests from various client computing devices and communicates appropriate responses to the requesting client devices. For example, the user interface module(s) 212 may receive requests in the form of Hypertext Transfer Protocol (HTTP) requests or other web-based API requests. In addition, a member interaction detection module 213 may be provided to detect various interactions that members have with different applications 120, services, and content presented. As shown in FIG. 2, upon detecting a particular interaction, the member interaction detection module 213 logs the interaction, including the type of interaction and any metadata relating to the interaction, in a member activity and behavior database 222.

An application logic layer may include one or more various application server modules 214, which, in conjunction with the user interface module(s) 212, generate various user interfaces (e.g., web pages) with data retrieved from various data sources in a data layer. In some embodiments, individual application server modules 214 are used to implement the functionality associated with various applications 120 and/or services provided by the social networking service.

As shown in FIG. 2, the data layer may include several databases 126, such as a profile database 218 for storing profile data, including both member profile data and profile data for various organizations (e.g., companies, schools, etc.). Consistent with some embodiments, when a person initially registers to become a member of the social networking service, the person will be prompted to provide some personal information, such as his or her name, age (e.g., birthdate), gender, interests, contact information, home town, address, spouse's and/or family members' names, educational background (e.g., schools, majors, matriculation and/or graduation dates, etc.), employment history, skills, professional organizations, and so on. This information is stored, for example, in the profile database 218. Similarly, when a representative of an organization initially registers the organization with the social networking service, the representative may be prompted to provide certain information about the organization. This information may be stored, for example, in the profile database 218 or another database (not shown). In some embodiments, the profile data may be processed (e.g., in the background or offline) to generate various derived profile data. For example, if a member has provided information about various job titles that the member has held with the same organization or different organizations, and for how long, this information can be used to infer or derive a member profile attribute indicating the member's overall seniority level or seniority level within a particular organization. In some embodiments, importing or otherwise accessing data from one or more externally hosted data sources may enrich profile data for both members and organizations. For instance, with organizations in particular, financial data may be imported from one or more external data sources and made part of an organization's profile.

Once registered, a member may invite other members, or be invited by other members, to connect via the social networking service. A "connection" may constitute a bilateral agreement by the members, such that both members acknowledge the establishment of the connection. Similarly, in some embodiments, a member may elect to "follow" another member. In contrast to establishing a connection, "following" another member typically is a unilateral operation and, at least in some embodiments, does not require acknowledgement or approval by the member who is being followed. When one member follows another, the member who is following may receive status updates (e.g., in an activity or content stream) or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed, commonly referred to as an activity stream or content stream. In any case, the various associations and relationships that the members establish with other members, or with other entities and objects, are stored and maintained within a social graph in a social graph database 220.

As members interact with the various applications 120, services, and content made available via the social networking service, the members' interactions and behavior (e.g., content viewed, links or buttons selected, messages responded to, etc.) may be tracked, and information concerning the members' activities and behavior may be logged or stored, for example, as indicated in FIG. 2, by the member activity and behavior database 222. This logged activity information may then be used by the search engine 216 to determine search results for a search query.

In some embodiments, the databases 218, 220, and 222 may be incorporated into the database(s) 126 in FIG. 1. However, other configurations are also within the scope of the present disclosure.

Although not shown, in some embodiments, the social networking system 210 provides an API module via which applications 120 and services can access various data and services provided or maintained by the social networking service. For example, using an API, an application 120 may be able to request and/or receive one or more navigation recommendations. Such applications 120 may be browser-based applications 120 or may be operating system-specific. In particular, some applications 120 may reside and execute (at least partially) on one or more mobile devices (e.g., phone or tablet computing devices) with a mobile operating system. Furthermore, while in many cases the applications 120 or services that leverage the API may be applications 120 and services that are developed and maintained by the entity operating the social networking service, nothing other than data privacy concerns prevents the API from being provided to the public or to certain third parties under special arrangements, thereby making the navigation recommendations available to third-party applications 128 and services.

Although the search engine 216 is referred to herein as being used in the context of a social networking service, it is contemplated that it may also be employed in the context of any website or online services. Additionally, although features of the present disclosure are referred to herein as being used or presented in the context of a web page, it is contemplated that any user interface view (e.g., a user interface on a mobile device or on desktop software) is within the scope of the present disclosure.

In an example embodiment, when member profiles are indexed, forward search indexes are created and stored. The search engine 216 facilitates the indexing of and searching for content within the social networking service, such as the indexing of and searching for data or information contained in the data layer, such as profile data (stored, e.g., in the profile database 218), social graph data (stored, e.g., in the social graph database 220), member activity and behavior data (stored, e.g., in the member activity and behavior database 222), and/or information in a feed objects database 224. The search engine 216 may collect, parse, and/or store data in an index or other similar structure to facilitate the identification and retrieval of information in response to received queries for information. This may include, but is not limited to, forward search indexes, inverted indexes, N-gram indexes, and so on.

The feed objects database 224 may contain objects that can be displayed in feeds of one or more members of the social networking service. A feed is a data format used for providing users with frequently updated content. In the social networking service, members may view their feed when, for example, they log into the social networking service. The feed contains one or more objects that the social networking service believes may be of interest to the user. The user feed may contain items from different categories (e.g., job postings, user postings, suggestions for new connections, sponsored posts, etc.). Creating the feed means ranking the items from the different categories, merging the items from the different categories, and creating the user feed, which presents the items in sequential order.

The process of ranking items and categories is often very complex, as different goals are desired, such as optimizing user experience and generating revenue from the different categories. This process is often tedious and requires a great deal of experimentation.

While the feed objects database 224 is depicted here as containing the feed objects, it should be noted that it is not necessary that all these potential feed objects be aggregated in a single database. In some example embodiments, the feed objects may be located in various other databases either in lieu of or in addition to the feed objects database 224, and whatever component desires to access feed objects, such as the search engine 216, can retrieve the feed objects across multiple databases. For simplicity, however, the present document will describe feed objects as being obtained from the feed objects database 224.

Figure 3:
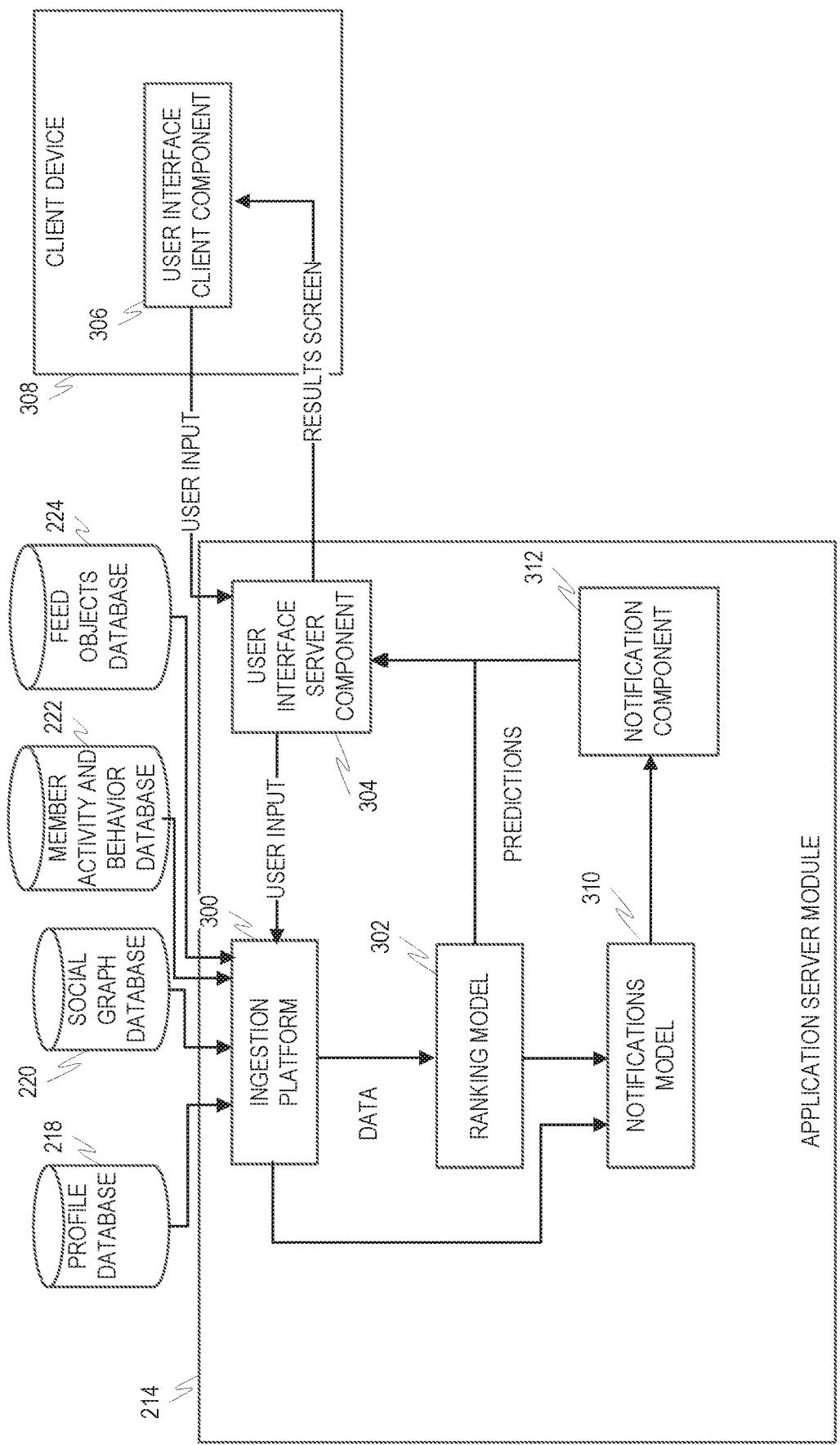
FIG. 3 is a block diagram illustrating an application server module of FIG. 2 in more detail, in accordance with an example embodiment.

FIG. 3 is a block diagram illustrating the application server module 214 of FIG. 2 in more detail, in accordance with an example embodiment. While in many embodiments, the application server module 214 will contain many subcomponents used to perform various different actions within the social networking system 210, in FIG. 3 only those components that are relevant to the present disclosure are depicted.

Here, an ingestion platform 300 obtains information from the profile database 218, the social graph database 220, the member activity and behavior database 222, and/or the feed objects database 224 relevant to a ranking model 302. At training time, the ingestion platform 300 sends this information to the ranking model 302 in order to train the ranking model 302, whereas at ranking time, such as when a social networking service needs to determine which feed objects to present to a particular user and in what order, the ingestion platform 300 sends information to the ranking model 302 in order to allow the ranking model 302 to output a ranking of the various potential feed objects to be displayed in the user's feed.

In some example embodiments, this information is transmitted in the form of feature vectors. For example, each member profile may have its own feature vector formed of the information in the profile database 218, the social graph database 220, and the member activity and behavior database 222. In other example embodiments, the ingestion platform 300 sends raw information to the ranking model 302, and the ranking model 302 creates its own feature vectors from the raw information.

A user interface server component 304 communicates with a user interface client component 306 located on a client device 308 to run the ranking model 302 and use its results to display or update a feed to a user. This may be performed in response to a user input, such as a navigation input to a web page that includes the feed. For example, a user could instruct the user interface client component 306 to log into a social networking service account. This log-in information could then be sent to the user interface server component 304, which can use this information to instruct the ingestion platform 300 to retrieve the appropriate information from the profile database 218, the social graph database 220, the member activity and behavior database 222, and/or the feed objects database 224.

The results from the ranking model 302 could then be sent to the user interface server component 304, which, along with the user interface client component 306, could select and format appropriate feed objects for display to the user. Details about how these objects could be displayed on the client device 308 via the user interface client component 306 will be described in more detail below.

In addition to using the ranking model 302 to determine which feed objects to display, in an example embodiment, a notifications model 310 may be used to determine when to send notifications to users for the feed objects displayed. The notifications model 310 may be trained jointly based on the value and likelihood of user interactions with the feed objects and the likelihood that a notification will increase the chances a user will interact with the feed object(s).

It should be noted that in some embodiments, the notifications model 310 will be trained and optimized differently than the ranking model 302, albeit using some of the same features and functions. In other example embodiments, the ranking model 302 itself may be used during the training of the notifications model 310, with the notifications model 310 essentially trained on top of the ranking model 302.

The output from the notifications model 310 may be passed to a notification component 312, which can then generate and send notifications (or not) based on this output.

Figure 4:
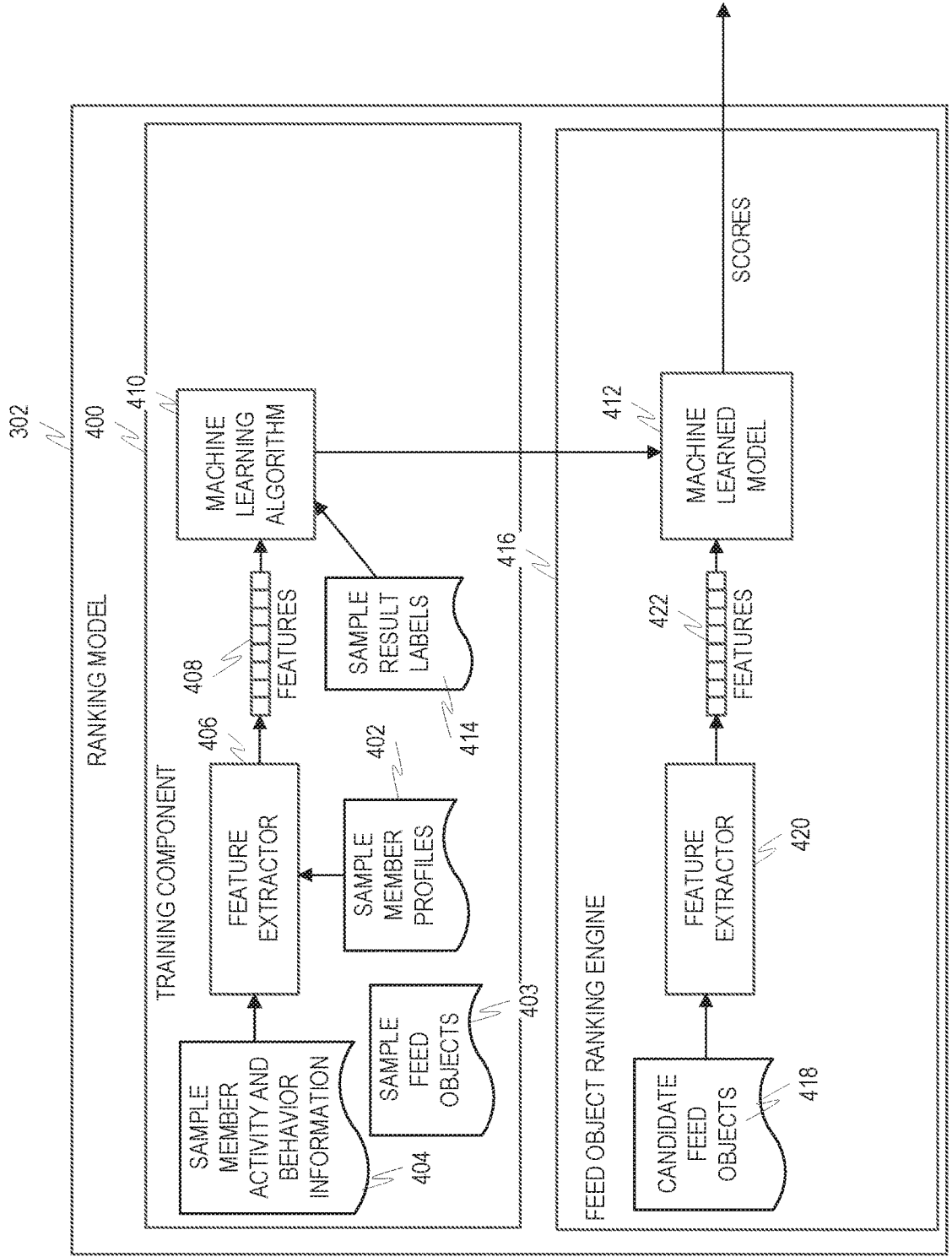
FIG. 4 is a block diagram illustrating the ranking model of FIG. 3 in more detail, in accordance with an example embodiment.

FIG. 4 is a block diagram illustrating the ranking model 302 of 3 in more detail, in accordance with an example embodiment. In a training component 400, sample member profiles 402, sample feed objects 403, and/or sample member activity and behavior information 404 are fed to a feature extractor 406, which acts to extract curated features 408 from the sample member profiles 402, sample feed objects 403, and/or sample member activity and behavior information 404. A feature is a variable pertaining to an input piece of data. Since the input may, in some example embodiments, be data related to a member of a social networking service, such as a member profile, member usage and/or activity data, or social graph information, the feature may be, for example, a portion of the member profile, member usage and/or activity data, or social graph. The feature may also be a variable calculated from a portion of the data, such as an average, sum, difference, measurement, and so on. The feature may also be some aspect of the sample feed objects, such as title, frequently appearing terms, and/or various metrics about the object, such as frequency of occurrence of key words.

In an example embodiment, the curated features 408 are then used as input to a machine learning algorithm 410 to train a machine learned model 412 to generate a probability that a feed object should be displayed to a particular user. While this probability may be based on the likelihood that the user may interact in some way with the feed object, as will be described in more detail below, it may also be based on the effect of viral actions by the user or downstream users, as well as the relative value of these effects on the social networking service as a whole. In certain types of machine learning algorithms, the training may include providing sample result labels 414 to the machine learning algorithm 410. Each of these sample result labels 414 is a score indicating a likelihood that a corresponding sample feed object should be displayed to a user.

The machine learning algorithm 410 may be selected from among many different potential supervised or unsupervised machine learning algorithms. Examples of supervised machine learning algorithms include artificial neural networks. Bayesian networks, instance-based learning, support vector machines, random forests, linear classifiers, quadratic classifiers, k-nearest neighbor, decision trees, and hidden Markov models. Examples of unsupervised machine learning algorithms include expectation-maximization algorithms, vector quantization, and information bottleneck methods. In an example embodiment, a binary logistic regression model is used. Binary logistic regression deals with situations in which the observed outcome for a dependent variable can have only two possible types. Logistic regression is used to predict the odds of one case or the other being true based on values of independent variables (predictors).

In a feed object ranking engine 416, candidate feed objects 418 are fed to a feature extractor 420, which acts to extract curated features 422 from the candidate feed objects 418 The curated features 422 are then used as input to the machine learned model 412, which outputs a score indicating the likelihood that the corresponding candidate feed objects 418 should be displayed in the feed.

Figure 5:
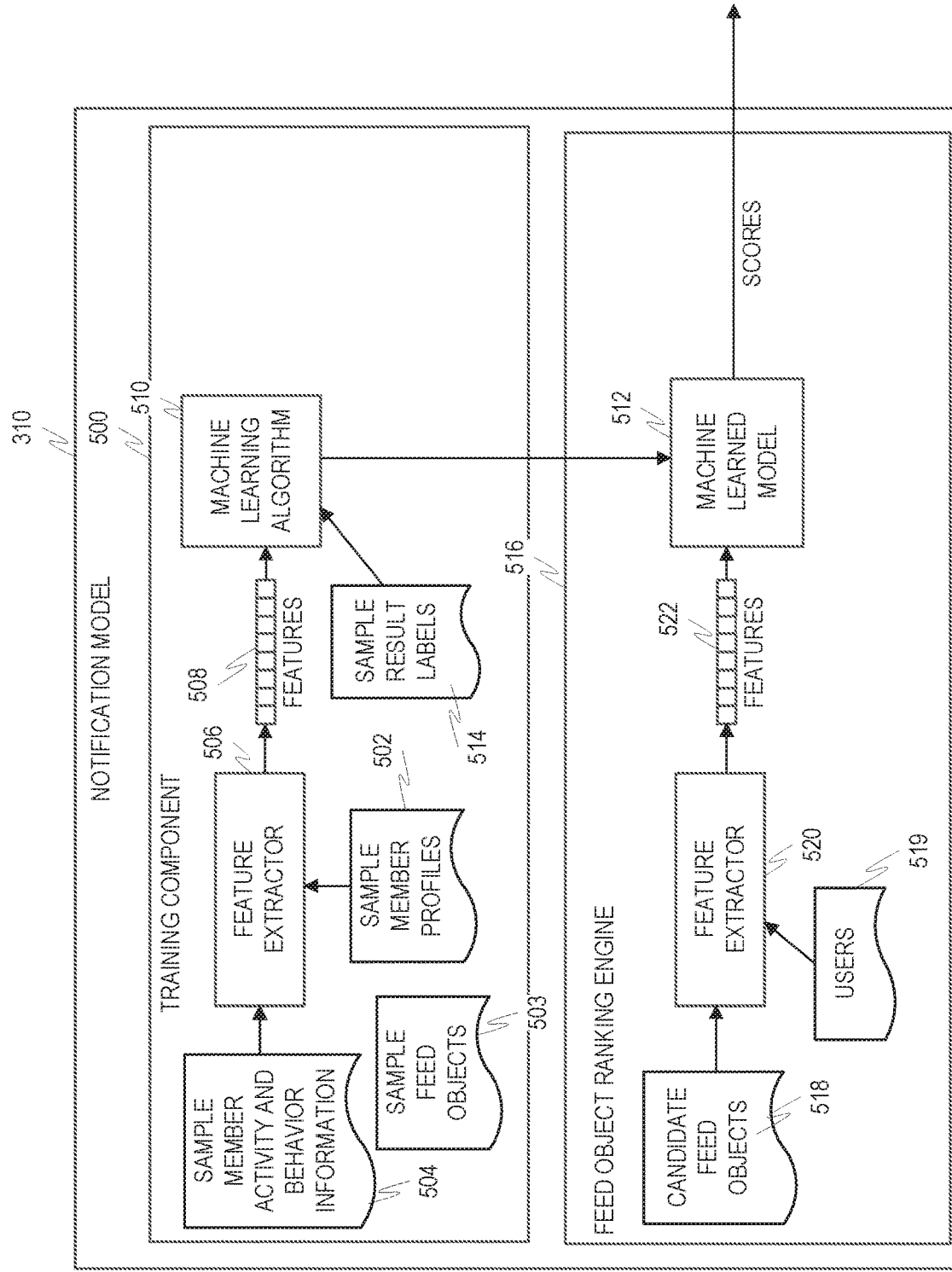
FIG. 5 is a block diagram illustrating the notifications model of FIG. 3 in more detail, in accordance with an example embodiment.

FIG. 5 is a block diagram illustrating the notifications model 310 of FIG. 3 in more detail, in accordance with an example embodiment. In a training component 500, sample member profiles 502, sample teed objects 503, and/or sample member activity and behavior information 504 are fed to a feature extractor 506, which acts to extract curated features 508 from the sample member profiles 502, sample feed objects 503, and/or sample member activity and behavior information 504. Since the input may, in some example embodiments, be data related to a member of a social networking service, such as a member profile, member usage and/or activity data, or social graph information, the feature may be, for example, a portion of the member profile, member usage and/or activity data, or social graph. The feature may also be a variable calculated from a portion of the data, such as an average, sum, difference, measurement, and so on. The feature may also be some aspect of the sample feed objects, such as title, frequently appearing terms, and/or various metrics about the object, such as frequency of occurrence of key words.

In an example embodiment, the curated features 508 are then used as input to a machine learning algorithm 510 to train a machine learned model 512 to generate a probability that a notification should be displayed to a particular pair of user and feed object. While this probability may be based on the likelihood that the user may interact in some way with the feed object, as will be described in more detail below, it may also be based on the effect of viral actions by the user or downstream users, as well as the relative value of these effects on the social networking service as a whole, as well as the likelihood that the user will interact with the feed object in response to the notification. In certain types of machine learning algorithms, the training may include providing sample result labels 514 to the machine learning algorithm 510. Each of these sample result labels 514 is a score indicating a likelihood that a corresponding sample feed object should be displayed to a user.

The machine learning algorithm 510 may be selected from among many different potential supervised or unsupervised machine learning algorithms. Examples of supervised machine learning algorithms include artificial neural networks, Bayesian networks, instance-based learning, support vector machines, random forests, linear classifiers, quadratic classifiers, k-nearest neighbor, decision trees, and hidden Markov models. Examples of unsupervised machine learning algorithms include expectation-maximization algorithms, vector quantization, and information bottleneck methods. In an example embodiment, a binary logistic regression model is used. Binary logistic regression deals with situations in which the observed outcome for a dependent variable can have only two possible types. Logistic regression is used to predict the odds of one case or the other being true based on values of independent variables (predictors).

In a notification engine 516, candidate feed objects 518 and users 519 are fed to a feature extractor 520, which acts to extract curated features 522 from the candidate feed objects 518 and users 519. The curated features 522 are then used as input to the machine learned model 512, which outputs a score indicating the likelihood that the users 519 should receive a notification about the corresponding feed object 518.

In an example embodiment, the machine learned model 512 that is the basis for the notifications model 310 is optimized based on expected downstream interactions in member, j's network and beyond if they take a viral action on a feed object $a_i$. The downstream impact of one member's activity can be qualified as:

$$DSI_i(a_i) = \Sigma_{j \in Connections}(a_i) pSeen_j(a_i) pViral_j(a_i) DSI_j(a_t).$$

where:

$$pSeen_j(a_i) = [pSeen_j^{Notification}(a_i) + pSeen_j^{Feed}(a_i)]$$

$$pSeen_j^{Notification}(a_i) = x_{ij} pVisit_j(x_{ij}=1) pImp_j(x_{ij}=1, Visit_j)$$

$$pSeen_j^{Feed}(a_i) = (1-x_{ij}) pVisit_j(x_{ij}=0) pImp_j(x_{ij}=0, Visit_j)$$

where:
i is the sharer of the feed object, $x_{ij}$: is the probability of sending a notification about activity $a_i$ to j, $pVisit_j(\ )$ is the probability of member j visiting the site within a pre-specified window, conditioned on a notification sent (or not sent), $pImp_j(a_i)$ is the probability that the member j will see an impression of $a_i$ when they visit $pClick_j(a_i)$: probability that the member j will click on $a_i$ if they see it, and $pViral_j(a_i)$: is the probability that the member j will take a viral action on $a_i$ if they see it.

It should be noted that in some example embodiments, in order to save on processing power and time, only the first degree connection downstream iteration will be predicted. More degrees of connection can be added as processing power/speed grow.

The DSI formula above can be calculated for each combination of user and feed object twice, once assuming that a notification is sent and once assuming a notification is not sent. The difference in DSI calculated for these two scenarios can then be computed and compared to a threshold. If this difference is greater than a particular threshold, then the advantage of sending a notification in contrast to the disadvantage is enough to warrant sending a notification.

The threshold may either be fixed or variable. If the threshold is variable, it may be adjusted based on various desires. For example, in an example embodiment, different classes of users are assigned different thresholds, providing a degree of personalization to the thresholds.

Thus, the notifications model 500 can be thought of as a model that calculates, for each of a plurality of possible feed objects, the difference in the DSI score between an assumption that a notification has been sent and an assumption that a notification has not been sent. As such, the notifications model 500 may combine the outputs of multiple machine learned models with a recursively computed DSI score for each of the first (or more) degree connections to the user in question. The first of these machine learned models may be the $pSeen_j(a_i)$ model, which may output the probability that the user will see the potential feed object. In some example embodiments this first machine learned model may use the assumption of whether or not a notification is sent as a feature (i.e., it may output a different result depending upon which assumption is made).

The second of these machine learned models may be the $pViral_j(a_i)$ model, which may output a combination of the probability that the user will interact, via a graphical user interface, with the potential teed object (such as by liking, commenting, or sharing the potential feed object), and the "value" of the interaction, which may be based at least in part on the size of the user's network.

In an example embodiment, the score output by this second machine learned model is based on the following objective function:

$$Objective^* = P_{ctr} + \alpha * P_{viral} * E_{DSI} + \beta * P_{response} * V_{actor}$$

$P_{CTR}$ is the probability that the viewer will engage directly with an update (e.g., click on it).

$P_{viral}$ is the probability that the viewer will engage with the update with a viral action (e.g., share like, or comment).

$E_{DSI}$ act is the expected downstream interaction from the viewer's downstream network.

$P_{response}$ is the probability of a viewer response (of any type) to an actor.

$V_{actor}$ is how much an actor values a viewer's response.

where $\alpha$ and $\beta$ are constants $P_{response}$ attempts to estimate the likelihood that some viewer, whether immediate or downstream, will respond to the teed object corresponding to the actor's contribution. This response may take many forms, including clicking, sharing, liking, commenting on, and so forth. This is based on the assumption that an actor getting a response will drive the actor to contribute again. This looks at the viewer's past interaction history to determine this probability, and thus features included in this model would include viewer features, such as user profile and past interaction history features.

$V_{actor}$ attempts to estimate the value of a response to an actor. In some example embodiments, $V_{actor} = e^{-\mu}$, where it is the expected number of responses the actor is going to get:

$$\mu = f(x)$$

where $f$ is the link function to predict expected number of responses and x are features used to predict how many responses an update will receive. The feature set includes but is not limited to:

Creator features, e.g., creator's past click through rate (CTR), creator network size, creator type (e.g., influencer or not)

Content features, e.g., content type, content engagement rate, content freshness Cross features, e.g., tree features, cross features between the above two sets In an example embodiment, log linear and/or Poisson regression may be used in this portion of the model.

In some example embodiments, $P_{viral}$ is based on a principled approach for handling viral actions. Viral actions are treated differently than regular clicks/selections because viral actions allow for the item to propagate through the network and increase visibility. Not all viral actions are equal (for example, varying either by type or by actor). For example, a share by the president of a multinational company has more effect than a share by a factory worker. Likewise, a share action may have more effect than a like action.

In some example embodiments, the $P_{CTR}$ and $P_{viral}$ portions of the model may be referred to as "expected engagement" and may be represented mathematically as E (m, u), which is the expected engagement of showing feed object u to user in. This score includes expected downstream engagement. This score may be calculated according to the following formula:

$$E(m,u)=P[A\neq \text{Null}]+\beta \Sigma_{A\in VA}P[A]*DE(m,u|A)$$

A is a random variable (random set) denoting the possible actions taken by in. This will include every kind of click-based action: click, like, share, comment, job view, connect, and so on. The set of viral actions is VA, which can be, for example, {like,share,comment}.

DE (m, u|A) is the incremental downstream engagement on object u if user in takes a viral action A. An optimal value should be chosen to maximize the expected long-term true-north metric from user m, β (which is less than or equal to 1) is the time discount factor determining the value of engagement in this current session versus that in a later session.

Of course, in some example embodiments, one or more of these terms may be difficult to estimate from a technical point of view. For example, DE (m, u|A) may be computationally challenging to estimate due to the exponential nature of viral actions. Additionally, as the model goes further and further downstream, there is a greater likelihood of cycles occurring in the social network being modeled. For example, if a first user shares an item with his network of 25 other users, then it is possible that one of those users may perform an action on the item, such as liking the item, that causes yet another action by the first user, such as causing the first user to then like the item. These cycles can cause difficulty in modeling downstream behavior. In an example embodiment, both the computational complexity and the cyclic aspect can be remedied by limiting downstream behavior to one degree. In other words, the machine learned model is limited to looking only at downstream behavior that is one degree from the user in.

In one example embodiment, the term DE(m, u|A) may be estimated using the following formula:

$$DE(m,u|A)=\#(N_m \backslash N_a)E(m,A)+\#(N_m \cap N_a)(E(m,A)-E(a,A_a)^+$$

$N_m$ and $N_a$ represent the networks of users m and a, respectively. E(m, A) is the average engagement of members in the network of m on objects coming from m because of action A. E(m, A)=Avg Actions. The function $x^+$ is the positive part of x, i.e., $x^+=x$ if $x>0$ and 0 otherwise.

The estimate is split into two parts:
(1) Network of m that is not in the network of a: In this group, the estimated engagement is $\#(N_m\ E(m, A)$.
(2) Network of m that is also in the network of a: In this group, if expected engagement due to a viral action of m is more than that due to the action from a, then there may be additional engagement due to in taking action A.

In some example embodiments, alternative methods may be used for this estimate. Examples include estimating DE by examining the impact of in and not incorporating any of the previous actors, examining the incremental impact m in can have in comparison to the actor and the root actor, and using an average DE from m with an Inverse Document Frequency (IDF)-style discounting on the average engagement on the object so far, such as $$DE(m,u|A)=E(m,A)/f(\text{impressions,interactions}),$$

where $f$ is some increasing function. In the latter case, DE is down-weighted if there are already a lot of impressions and interactions in the object.

In some example embodiments, not only the type of the viral action but content related to the viral action may be taken into account by the machine learned model 512. Specifically, while some viral actions themselves do not contain content beyond their type, such as a "like" action, other viral actions sometimes do contain content in addition to their type, such as text entered as comments when sharing a feed object. In some example embodiments, for instance, this text may be analyzed, such as by using natural language processing techniques, and this analysis may be used to create one or more feature vectors used by the machine learned model 512 to output the score.

Thus, the model may be thought of as having have four portions: an actor-to-viewer portion ($P_{CTR}$) a viewer-to-downstream portion ($P_{viral}$), a downstream-to-viewer portion ($E_{DSI}$), and a viewer-to-actor portion($P_{response}$ and $V_{actor}$). Each of these four portions may be trained separately or together. The training causes weights assigned to features relevant to each of the four portions to be learned. It should also be noted that the value of each of these four portions may be assigned a weight, and in some example embodiments these portion weights may also be learned via a machine learning algorithm.

Figure 6:
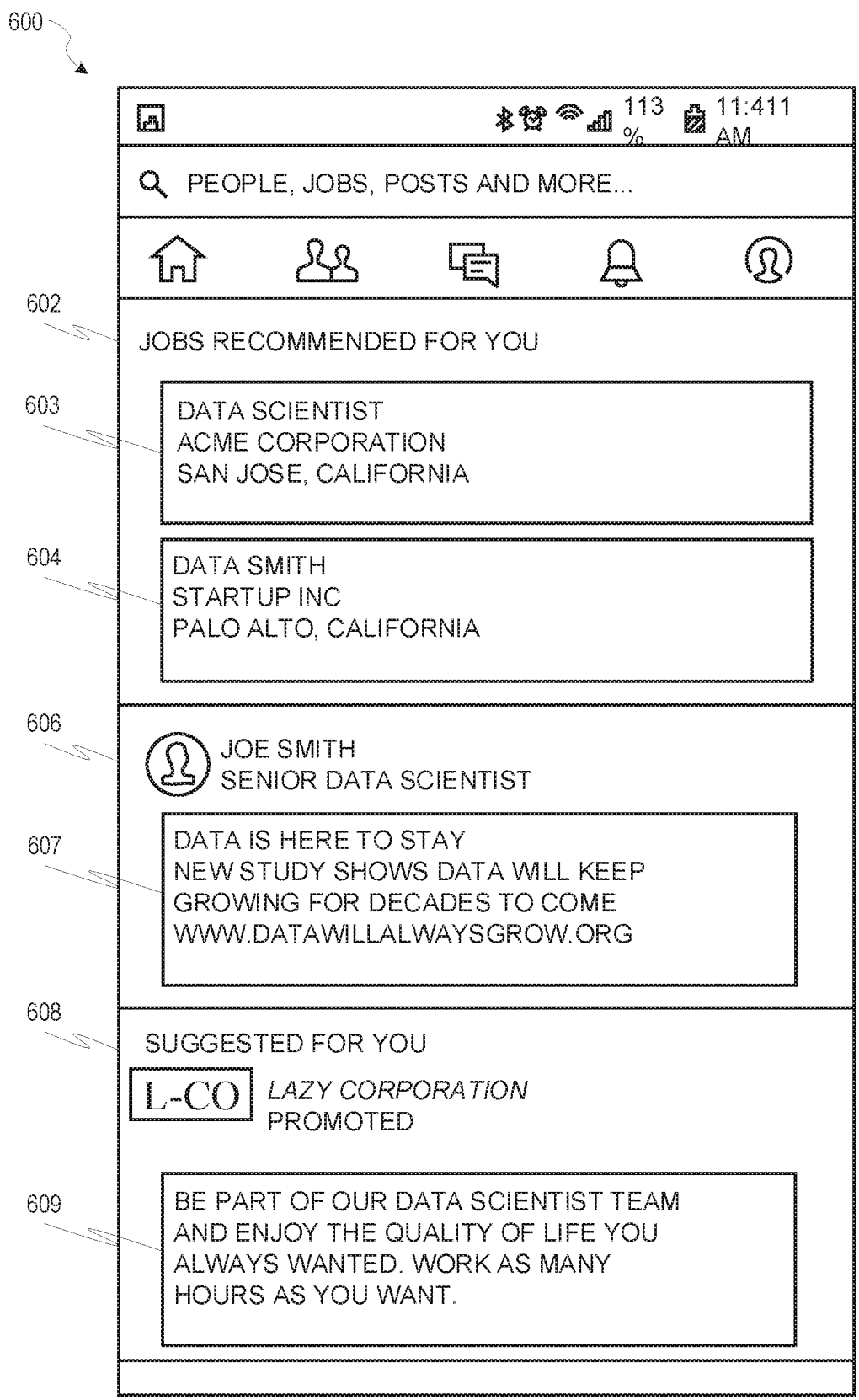
FIG. 6 is a screenshot of a user feed that includes items in different categories, according to some example embodiments.

FIG. 6 is a screenshot of a user feed 600 that includes items in different categories, according to some example embodiments. In the example embodiment of FIG. 6, the user feed 600 includes different categories, such as job recommendations 602, user posts 606, and sponsored items 608, and other embodiments may include additional categories.

In one example embodiment, the user feed 600 provides the job recommendations 602 (e.g., job posts 603 and 604) that match the job interests of the user and that are presented with a specific job search request from the user.

The user posts 606 include items 607 posted by users of the social networking service, such as connections of the user, to make comments on the social networking service or to include articles or webpages of interest.

The sponsored items 608 are items 609 placed by sponsors of the social networking service, which pay a fee for posting those items on user feeds, and may include advertisements or links to webpages that the sponsors want to promote.

Although the categories are shown as separated within the user feed 600, the items from the different categories may be intermixed and not just be presented as a block. Thus, the user feed 600 may include a large number of items from each of the categories, and the social networking service decides the order in which these items are presented to the user based on the desired utilities.

Figure 7:
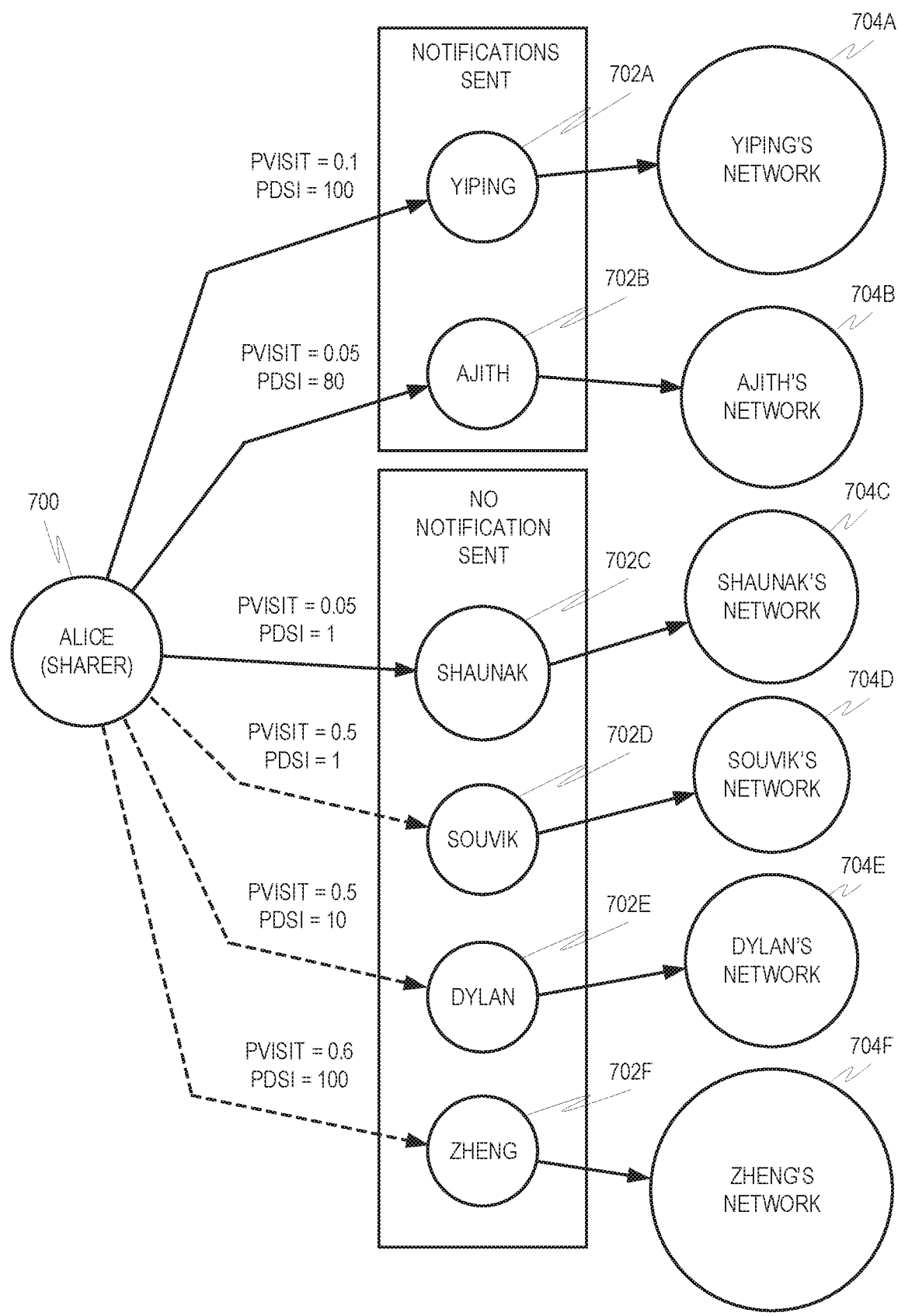
FIG. 7 is a block diagram illustrating downstream interaction calculations, in accordance with an example embodiment.

FIG. 7 is a block diagram illustrating downstream interaction calculations, in accordance with an example embodiment. A sharer (Alice 700) shares a content item with six members of her network, Yiping 702A, Ajith 702B, Shaunak 702C, Souvik 702D, Dylan 702E, and Zheng 702F. Each of these members has their own network 704A, 704B, 704C, 704D, 704E, and 704F of connected members, with each network 704A, 704B, 704C, 704F, 704E, and 704F being of a potentially different size. While size is not necessarily the only measure of impact, it can be an important factor. As such, a member, such as Yiping 702A, who has a relatively low pVisit score, meaning the likelihood of seeing the shared content without a notification may be quite low (here, 0.1), may nonetheless be sent a notification about the shared content due to the size of his network 704A. In contrast, a member, such as Souvik 704D, who has a relatively high pVisit score (here, 0.5) may nonetheless not be sent a notification about the shared content due to the lack of size of his network 704D.

For a member such as Zheng 702F, no notification is provided even though his network 704F is large and his DR score calculated to be quite high. This may be because the difference between his DSI score when no notification is sent versus when a notification is sent is not greater than a threshold. In other words, merely because the member is very likely to interact with a teed object and it is very valuable to the system if he does, a notification may still not be sent if, for example, the sending of the notification does not actually add much, if anything, to the probability of such an interaction occurring. This can often happen in cases where a member is quite active on the social networking service already (and hence would likely come across the feed object organically, without the need for a notification).

Figure 8:
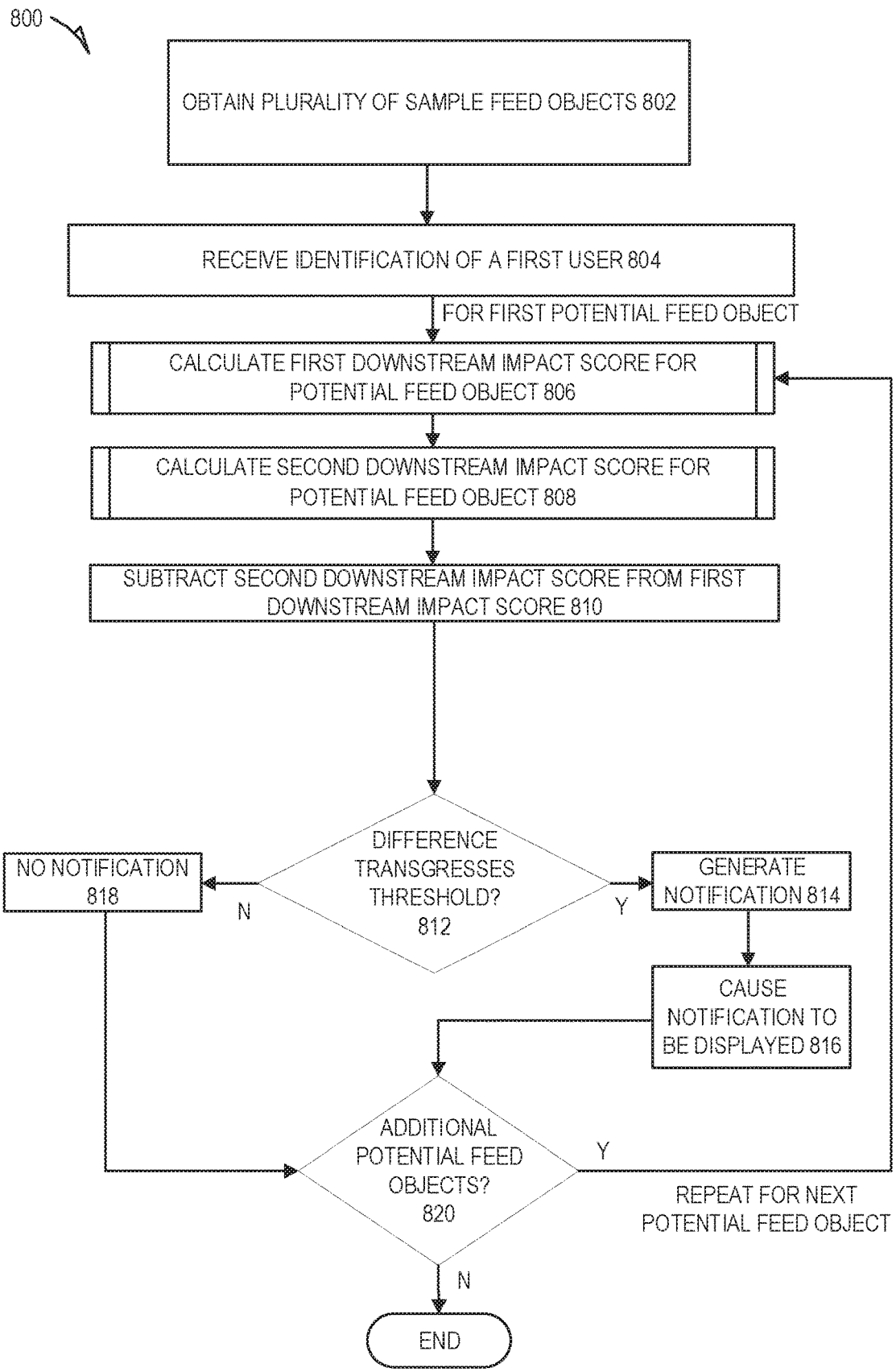
FIG. 8 is a flow diagram illustrating a method for determining whether to send a notification for each of one or more potential feed objects, in accordance with an example embodiment.

FIG. 8 is a flow diagram illustrating a method 800 for determining whether to send a notification for each of one or more potential feed objects in accordance with an example embodiment.

At operation 802, a plurality of sample feed objects are obtained. At operation 804, an identification of a first user of an online service is received. The first user of the online service has a connection in the online service to each of one or more additional users of the online service. Then a loop is begun for each of the plurality of potential feed objects. At operation 806, a first downstream impact score is calculated for the potential feed object. The calculating of the first downstream impact score indicates a likelihood and value of the first user interacting with the potential feed object if a notification regarding the potential teed object is sent to the first user, based on one or more machine learned models. At operation 808, a second downstream impact score is calculated for the potential teed object. The calculating of the second downstream impact score indicates a likelihood and value of the second user interacting with the potential feed object if a notification regarding the potential feed object is not sent to the first user, based on one or more machine learned models.

At operation 810, the second downstream impact score is subtracted from the first downstream impact score, producing a difference. At operation 812, it is determined if the difference transgresses a threshold. If so, at operation 814, a notification regarding the potential feed object is generated and, at operation 816, the notification is caused to be presented to the first user. This causing may be performed in a number of different ways depending upon the graphical user interface and system used by the user. In some example embodiments, the notification is generated and sent as an email or text message. In other example embodiments, the notification is generated and surfaced via an application running on a user device (such as an "app" running on a mobile device). In some example embodiments, the application may actually surface the notification using the operating system on the user device.

If it was determined at operation 810 that the difference does not transgress a threshold, then at 816, no notification regarding the potential feed object is generated or sent. At operation 818, it is determined if there are any additional potential teed objects to examine. If so, then the method 800 loops back to operation 806 for the next potential feed object. If not, then the method 800 ends.

FIG. 9 is a flow diagram illustrating a method 806 of calculating a first downstream impact score, in accordance with an example embodiment.

At operation 900, the potential feed object, the identification of the first user, and an indication that a notification regarding the potential feed object will be sent to the first user is fed to a first machine learned model trained to output a probability that the potential feed object will be seen by the first user. At operation 902, the potential feed object, the identification of the first user, and an indication that a notification regarding the potential feed object will be sent to the first user is fed to a second machine learned model trained to output a combination of a probability that the potential feed object will be interacted with via a graphical interface by the first user and a value that such interaction would provide. At operation 904, the output of the first machine learned model and the second machine learned model are combined with a first recursively calculated downstream impact score for each of the one or more additional users of the online service having a connection to the first user.

Figure 10:
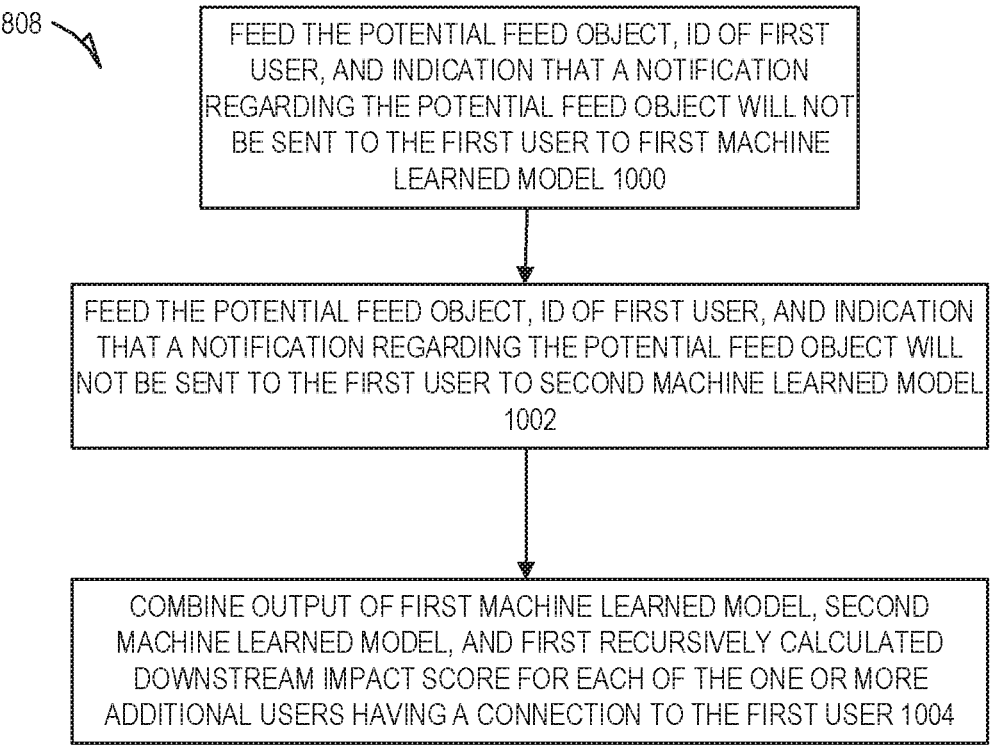
FIG. 10 is a flow diagram illustrating method 808 of calculating a second downstream impact score, in accordance with an example embodiment.

FIG. 10 is a flow diagram illustrating a method 808 of calculating a second downstream impact score in accordance with an example embodiment.

At operation 1000, the potential feed object, the identification of the first user, and an indication that a notification regarding the potential feed object will not be sent to the first user are fed to the first machine learned model. At operation 1002, the potential feed object, the identification of the first user, and an indication that a notification regarding the potential feed object will not be sent to the first user are fed to the second machine learned model. At operation 1004, the output of the first machine learned model and the second machine learned model are combined with a second recursively calculated downstream impact score for each of the one or more additional users of the online service having a connection to the first user.

Figure 11:
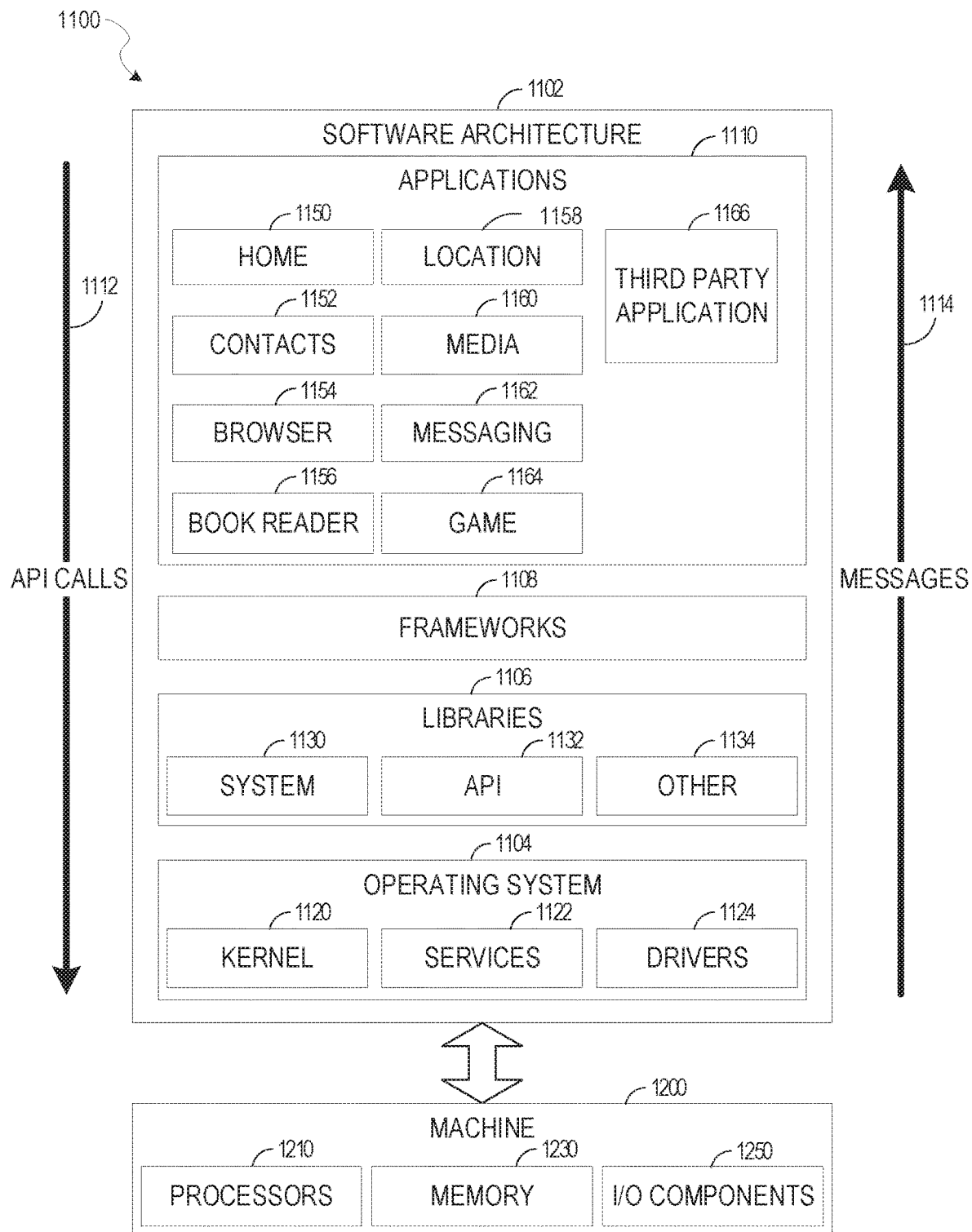
FIG. 11 is a block diagram illustrating an architecture of software, which can be installed on any one or more of the devices described above.

FIG. 11 is a block diagram 1100 illustrating a software architecture 1102, which can be installed on any one or more of the devices described above. FIG. 11 is merely a non-limiting example of a software architecture, and it will be appreciated that many other architectures can be implemented to facilitate the functionality described herein. In various embodiments, the software architecture 1102 is implemented by hardware such as a machine 1200 of FIG. 12 that includes processors 1210, memory 1230, and input/output (I/O) components 1250. In this example architecture, the software architecture 1102 can be conceptualized as a stack of layers where each layer may provide a particular functionality. For example, the software architecture 1102 includes layers such as an operating system 1104, libraries 1106, frameworks 1108, and applications 1110. Operationally, the applications 1110 invoke API calls 1112 through the software stack and receive messages 1114 in response to the API calls 1112, consistent with some embodiments.

In various implementations, the operating system 1104 manages hardware resources and provides common services. The operating system 1104 includes, for example, a kernel 1120, services 1122, and drivers 1124. The kernel 1120 acts as an abstraction layer between the hardware and the other software layers, consistent with some embodiments. For example, the kernel 1120 provides memory management, processor management (e.g., scheduling), component management, networking, and security settings, among other functionality. The services 1122 can provide other common services for the other software layers. The drivers 1124 are responsible for controlling or interfacing with the underlying hardware, according to some embodiments. For instance, the drivers 1124 can include display drivers, camera drivers, BLUETOOTH® or BLUETOOTH® Low Energy drivers, flash memory drivers, serial communication drivers (e.g., Universal Serial Bus (USB) drivers), Wi-Fi-drivers, audio drivers, power management drivers, and so forth.

In some embodiments, the libraries 1106 provide a low-level common infrastructure utilized by the applications 1110. The libraries 1106 can include system libraries 1130 (e.g., C standard library) that can provide functions such as memory allocation functions, string manipulation functions, mathematic functions, and the like. In addition, the libraries 1106 can include API libraries 1132 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 1106 can also include a wide variety of other libraries 1134 to provide many other APIs to the applications 1110.

The frameworks 1108 provide a high-level common infrastructure that can be utilized by the applications 1110, according to some embodiments. For example, the frameworks 1108 provide various GUI functions, high-level resource management, high-level location services, and so forth. The frameworks 1108 can provide a broad spectrum of other APIs that can be utilized by the applications 1110, some of which may be specific to a particular operating system 1104 or platform.

In an example embodiment, the applications 1110 include a home application 1150, a contacts application 1152, a browser application 1154, a book reader application 1156, a location application 1158, a media application 1160, a messaging application 1162, a game application 1164, and a broad assortment of other applications such as a third-party application 1166. According to some embodiments, the applications 1110 are programs that execute functions defined in the programs. Various programming languages can be employed to create one or more of the applications 1110, structured in a variety of manners, such as object-oriented programming languages (e.g., Objective-C, Java, or C++) or procedural programming languages (e.g., C or assembly language). In a specific example, the third-party application 1166 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1166 can invoke the API calls 1112 provided by the operating system 1104 to facilitate functionality described herein.

Figure 12:
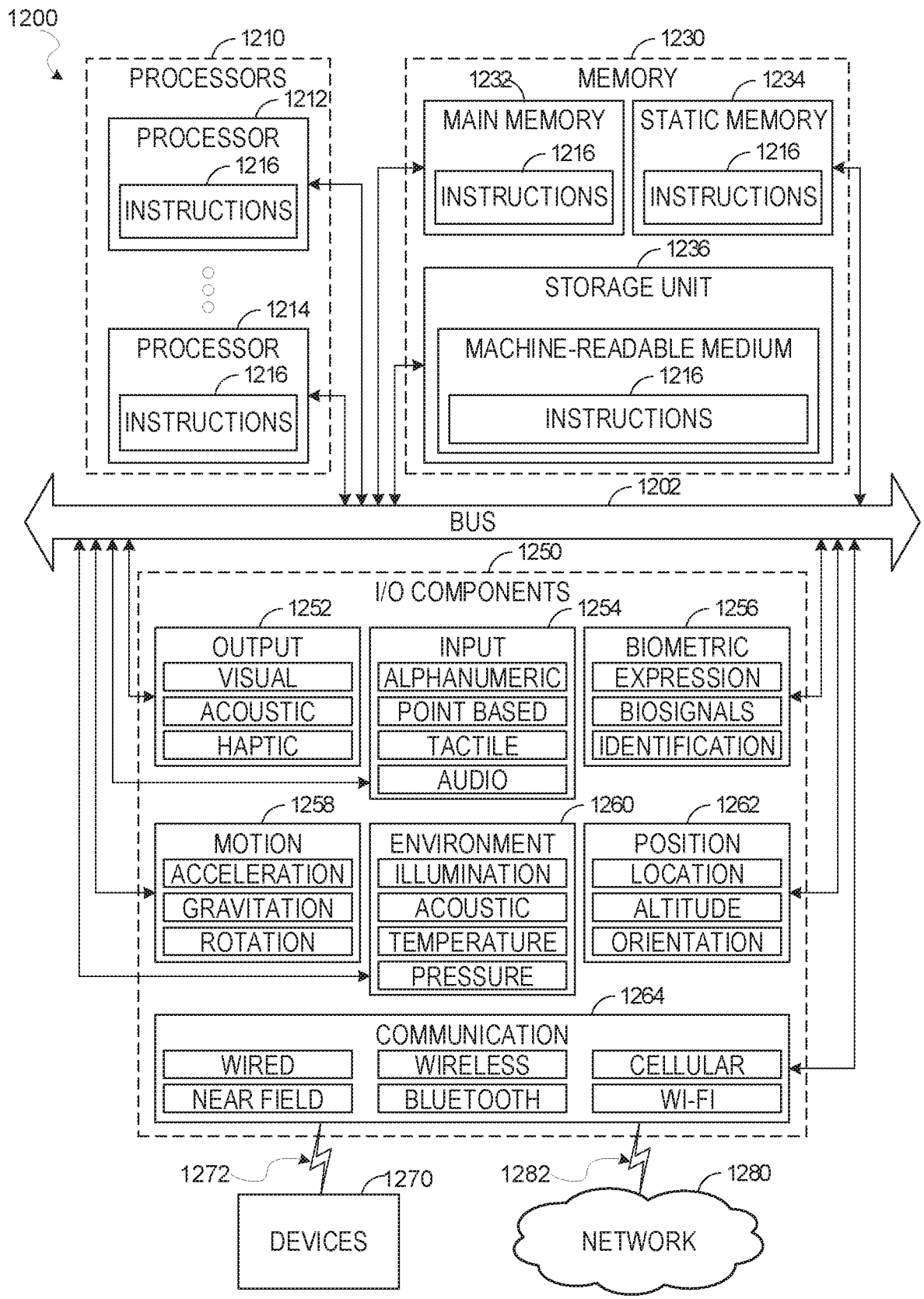
FIG. 12 illustrates a diagrammatic representation of a machine in the form of a computer system within which a set of instructions may be executed for causing the machine to perform any one or more of the methodologies discussed herein, according to an example embodiment.

FIG. 12 illustrates a diagrammatic representation of a machine 1200 in the form of a computer system within which a set of instructions may be executed for causing the machine to perform any one or more of the methodologies discussed herein, according to an example embodiment. Specifically, FIG. 12 shows a diagrammatic representation of the machine 1200 in the example form of a computer system, within which instructions 1216 (e.g., software, a program, an application 1110, an applet, an app, or other executable code) for causing the machine 1200 to perform any one or more of the methodologies discussed herein may be executed. For example, the instructions 1216 may cause the machine 1200 to execute the method 800 of FIG. 8. Additionally, or alternatively, the instructions 1216 may implement FIGS. 1-10, and so forth. The instructions 1216 transform the general, non-programmed machine 1200 into a particular machine 1200 programmed to carry out the described and illustrated functions in the manner described. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a PC, a tablet computer, a laptop computer, a netbook, a set-top box (STB), a portable digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 1216, sequentially or otherwise, that specify actions to be taken by the machine 1200. Further, while only a single machine 1200 is illustrated, the term "machine" shall also be taken to include a collection of machines 1200 that individually or jointly execute the instructions 1216 to perform any one or more of the methodologies discussed herein.

The machine 1200 may include processors 1210, memory 1230, and I/O components 1250, which may be configured to communicate with each other such as via a bus 1202. In an example embodiment, the processors 1210 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1212 and a processor 1214 that may execute the instructions 1216. The term "processor" is intended to include multi-core processors that may comprise two or more independent processors (sometimes referred to as "cores") that may execute instructions 1216 contemporaneously. Although FIG. 12 shows multiple processors 1210, the machine 1200 may include a single processor with a single core, a single processor with multiple cores (e.g., a multi-core processor), multiple processors with a single core, multiple processors with multiple cores, or any combination thereof.

The memory 1230 may include a main memory 1232, a static memory 1234, and a storage unit 1236, all accessible to the processors 1210 such as via the bus 1202. The main memory 1232, the static memory 1234, and the storage unit 1236 store the instructions 1216 embodying any one or more of the methodologies or functions described herein. The instructions 1216 may also reside, completely or partially, within the main memory 1232, within the static memory 1234, within the storage unit 1236, within at least one of the processors 1210 (e.g., within the processor's cache memory), or any suitable combination thereof, during execution thereof by the machine 1200.

The I/O components 1250 may include a wide variety of components to receive input, provide output, produce output, transmit information, exchange information, capture measurements, and so on. The specific I/O components 1250 that are included in a particular machine 1200 will depend on the type of machine 1200. For example, portable machines such as mobile phones will likely include a touch input device or other such input mechanisms, while a headless server machine will likely not include such a touch input device. It will be appreciated that the I/O components 1250 may include many other components that are not shown in FIG. 12. The I/O components 1250 are grouped according to functionality merely for simplifying the following discussion, and the grouping is in no way limiting. In various example embodiments, the I/O components 1250 may include output components 1252 and input components 1254. The output components 1252 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1254 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1250 may include biometric components 1256, motion components 1258, environmental components 1260, or position components 1262, among a wide array of other components. For example, the biometric components 1256 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1258 may include acceleration sensor components (e.g., accelerometer), gravitation sensor components, rotation sensor components (e.g., gyroscope), and so forth. The environmental components 1260 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1262 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1250 may include communication components 1264 operable to couple the machine 1200 to a network 1280 or devices 1270 via a coupling 1282 and a coupling 1272, respectively. For example, the communication components 1264 may include a network interface component or another suitable device to interface with the network 1280. In further examples, the communication components 1264 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1270 may be another machine or any of a wide variety of peripheral devices (e.g., a peripheral device coupled via a USB).

Moreover, the communication components 1264 may detect identifiers or include components operable to detect identifiers. For example, the communication components 1264 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1264, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 1230, 1232, 1234, and/or memory of the processor(s) 1210) and/or the storage unit 1236 may store one or more sets of instructions 1216 and data structures (e.g., software) embodying or utilized by any one or more of the methodologies or functions described herein. These instructions (e.g., the instructions 1216), when executed by the processor(s) 1210, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 1216 and/or data. The terms shall accordingly be taken to include, but not be limited to, solid-state memories, and optical and magnetic media, including memory internal or external to the processors 1210. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EE- PROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 1280 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1280 or a portion of the network 1280 may include a wireless or cellular network, and the coupling 1282 may be a Code Division Multiple Access (CDMA) connection, a Global System for Mobile communications (GSM) connection, or another type of cellular or wireless coupling. In this example, the coupling 1282 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet, Access (HSPA), Worldwide Interoperability for Microwave Access (WiMAX), Long-Term Evolution (LTE) standard, others defined by various standard-setting organizations, other long-range protocols, or other data-transfer technology.

The instructions 1216 may be transmitted or received over the network 1280 using a transmission medium via a network interface device (e.g., a network interface component included in the communication components 1264) and utilizing any one of a number of well-known transfer protocols (e.g., HTTP). Similarly, the instructions 1216 may be transmitted or received using a transmission medium via the coupling 1272 (e.g., a peer-to-peer coupling) to the devices 1270. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1216 for execution by the machine 1200, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   a memory; and
   a non-transitory computer-readable medium having instructions stored thereon, which, when executed by a processor, cause the system to:
   obtain a plurality of potential feed objects, wherein each potential feed object includes a data structure containing a piece of information that could potentially be displayed in a feed in a graphical user interface of an online service;
   receive an identification of a first user of the online service, the first user of the online service having a connection in the online service to each of one or more additional users of the online service;
   for each of the plurality of potential feed objects:
   calculate a first downstream impact score for the potential feed object, the calculating of the first downstream impact score indicating a likelihood and value of the first user interacting with the potential feed object if a notification regarding the potential feed object is sent to the first user, based on one or more machine learned models;
   calculate a second downstream impact score for the potential feed object, the calculating of the second downstream impact score indicating a likelihood and value of a second user interacting with the potential feed object if a notification regarding the potential feed object is not sent to the first user, based on one or more machine learned models;
   subtract the second downstream impact score from the first downstream impact score, producing a difference;
   determine if the difference transgresses a threshold;
   in response to a determination that the difference transgresses a threshold, generate a notification regarding the potential feed object and cause the notification to be presented to the first user.

2. The system of claim 1, wherein the calculating the first downstream impact score for the potential feed object comprises:
   feeding the potential feed object, the identification of the first user, and an indication that a notification regarding the potential feed object will be sent to the first user to a first machine learned model trained to output a probability that the potential feed object will be seen by the first user;
   feeding the potential feed object, the identification of the first user, and an indication that a notification regarding the potential feed object will be sent to the first user to a second machine learned model trained to output a combination of a probability that the potential feed object will be interacted with via a graphical user interface by the first user and a value that such interaction would provide; and
   combining the output of the first machine learned model and the second machine learned model with a first recursively calculated downstream impact score for each of the one or more additional users of the online service having a connection to the first user.

3. The system of claim 2, wherein the calculating the second downstream impact score for the potential feed object comprises:
   feeding the potential feed object, the identification of the first user, and an indication that a notification regarding the potential feed object will not be sent to the first user to the first machine learned model;
   feeding the potential feed object, the identification of the first user, and an indication that a notification regarding the potential feed object will not be sent to the first user to the second machine learned model; and combining the output of the first machine learned model and the second machine learned model with a second recursively calculated downstream impact score for each of the one or more additional users of the online service having a connection to the first user.

4. The system of claim 3, wherein the first and second recursively calculated downstream impact scores are calculated only for first degree connections of the first user.

5. The system of claim 3, wherein the first and second recursively calculated downstream impact scores are calculated for first degree and greater than first degree connections of the first user.

6. The system of claim 2, wherein the second machine learned model is trained to utilize an actor for a corresponding potential feed object as a feature in determining a combination of a probability that the potential feed object will be interacted with via a graphical user interface by the first user and a value that such interaction would provide.

7. The system of claim 2, wherein the second machine learned model is trained to utilize a network size for a user as a feature in determining a combination of a probability that the potential feed object will be interacted with via a graphical user interface by the first user and a value that such interaction would provide.

8. A method comprising:
obtaining a plurality of potential feed objects, wherein each potential feed object includes a data structure containing a piece of information that could potentially be displayed in a feed in a graphical user interface of an online service;
receiving an identification of a first user of the online service, the first user of the online service having a connection in the online service to each of one or more additional users of the online service;
for each of the plurality of potential feed objects:
calculating a first downstream impact score for the potential feed object, the calculating of the first downstream impact score indicating a likelihood and value of the first user interacting with the potential feed object if a notification regarding the potential feed object is sent to the first user, based on one or more machine learned models;
calculating a second downstream impact score for the potential feed object, the calculating of the second downstream impact score indicating a likelihood and value of a second user interacting with the potential feed object if a notification regarding the potential feed object is not sent to the first user, based on one or more machine learned models;
subtracting the second downstream impact score from the first downstream impact score, producing a difference;
determining if the difference transgresses a threshold;
in response to a determination that the difference transgresses a threshold, generating a notification regarding the potential feed object and causing the notification to be presented to the first user.

9. The method of claim 8, wherein the calculating the first downstream impact score for the potential feed object comprises:
feeding the potential feed object, the identification of the first user, and an indication that a notification regarding the potential feed object will be sent to the first user to a first machine learned model trained to output a probability that the potential feed object will be seen by the first user;

feeding the potential feed object, the identification of the first user, and an indication that a notification regarding the potential feed object will be sent to the first user to a second machine learned model trained to output a combination of a probability that the potential feed object will be interacted with via a graphical user interface by the first user and a value that such interaction would provide; and combining the output of the first machine learned model and the second machine learned model with a first recursively calculated downstream impact score for each of the one or more additional users of the online service having a connection to the first user.

10. The method of claim 9, wherein the calculating the second downstream impact score for the potential feed object comprises:
feeding the potential feed object, the identification of the first user, and an indication that a notification regarding the potential feed object will not be sent to the first user to the first machine learned model;
feeding the potential feed object, the identification of the first user, and an indication that a notification regarding the potential feed object will not be sent to the first user to the second machine learned model; and
combining the output of the first machine learned model and the second machine learned model with a second recursively calculated downstream impact score for each of the one or more additional users of the online service having a connection to the first user.

11. The method of claim 10, wherein the first and second recursively calculated downstream impact scores are calculated only for first degree connections of the first user.

12. The method of claim 10, wherein the first and second recursively calculated downstream impact scores are calculated for first degree and greater than first degree connections of the first user.

13. The method of claim 9, wherein the second machine learned model is trained to utilize an actor for a corresponding potential feed object as a feature in determining a combination of a probability that the potential feed object will be interacted with via a graphical user interface by the first user and a value that such interaction would provide.

14. The method of claim 9, wherein the second machine learned model is trained to utilize a network size for a user as a feature in determining a combination of a probability that the potential feed object will be interacted with via a graphical user interface by the first user and a value that such interaction would provide.

15. A non-transitory machine-readable storage medium comprising instructions which, when implemented by one or more machines, cause the one or more machines to perform operations comprising:
obtaining a plurality of potential feed objects, wherein each potential feed object includes a data structure containing a piece of information that could potentially be displayed in a feed in a graphical user interface of an online service;
receiving an identification of a first user of the online service, the first user of the online service having a connection in the online service to each of one or more additional users of the online service;
for each of the plurality of potential feed objects:
calculating a first downstream impact score for the potential feed object, the calculating of the first downstream impact score indicating a likelihood and value of the first user interacting with the potential feed object if a notification regarding the potential feed object is sent to the first user, based on one or more machine learned models;

calculating a second downstream impact score for the potential feed object, the calculating of the second downstream impact score indicating a likelihood and value of a second user interacting with the potential feed object if a notification regarding the potential feed object is not sent to the first user, based on one or more machine learned models;

subtracting the second downstream impact score from the first downstream impact score, producing a difference;

determining if the difference transgresses a threshold;

in response to a determination that the difference transgresses a threshold, generating a notification regarding the potential feed object and causing the notification to be presented to the first user.

16. The non-transitory machine-readable storage medium of claim 15, wherein the calculating the first downstream impact score for the potential feed object comprises:

feeding the potential feed object, the identification of the first user, and an indication that a notification regarding the potential feed object will be sent to the first user to a first machine learned model trained to output a probability that the potential feed object will be seen by the first user;

feeding the potential feed object, the identification of the first user, and an indication that a notification regarding the potential feed object will be sent to the first user to a second machine learned model trained to output a combination of a probability that the potential feed object will be interacted with via a graphical user interface by the first user and a value that such interaction would provide; and combining the output of the first machine learned model and the second machine learned model with a first recursively calculated downstream impact score for each of the one or more additional users of the online service having a connection to the first user.

17. The non-transitory machine-readable storage medium of claim 16, wherein the calculating the second downstream impact score for the potential feed object comprises:

feeding the potential feed object, the identification of the first user, and an indication that a notification regarding the potential feed object will not be sent to the first user to the first machine learned model;

feeding the potential feed object, the identification of the first user, and an indication that a notification regarding the potential feed object will not be sent to the first user to the second machine learned model; and combining the output of the first machine learned model and the second machine learned model with a second recursively calculated downstream impact score for each of the one or more additional users of the online service having a connection to the first user.

18. The non-transitory machine-readable storage medium of claim 17, wherein the first and second recursively calculated downstream impact scores are calculated only for first degree connections of the first user.

19. The non-transitory machine-readable storage medium of claim 17, wherein the first and second recursively calculated downstream impact scores are calculated for first degree and greater than first degree connections of the first user.

20. The non-transitory machine-readable storage medium of claim 16, wherein the second machine learned model is trained to utilize an actor for a corresponding potential feed object as a feature in determining a combination of a probability that the potential feed object will be interacted with via a graphical user interface by the first user and a value that such interaction would provide.

* * * * *